(12) United States Patent
Yano

(10) Patent No.: US 8,471,882 B2
(45) Date of Patent: Jun. 25, 2013

(54) IMAGE FORMING APPARATUS

(75) Inventor: Yuzuru Yano, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 13/233,355

(22) Filed: Sep. 15, 2011

(65) Prior Publication Data

US 2012/0069121 A1    Mar. 22, 2012

(30) Foreign Application Priority Data

Sep. 22, 2010 (JP) ................................. 2010-211733

(51) Int. Cl.
*B41J 2/435* (2006.01)
*B41J 2/47* (2006.01)

(52) U.S. Cl.
USPC ............ 347/237; 347/236; 347/247; 347/252

(58) Field of Classification Search
USPC ........................... 347/236, 246, 237, 247, 252
See application file for complete search history.

(56) References Cited

U.S. PATENT DOCUMENTS

| 5,794,130 | A | * | 8/1998 | Abe et al. | 455/76 |
| 5,926,640 | A | * | 7/1999 | Mason et al. | 713/320 |
| 6,154,246 | A | | 11/2000 | Ogasawara et al. | |
| 6,498,617 | B1 | * | 12/2002 | Ishida et al. | 347/252 |
| 2004/0070663 | A1 | * | 4/2004 | Niito | 347/236 |

FOREIGN PATENT DOCUMENTS

| JP | 09-183250 A | 7/1997 |
| JP | 2007-152731 A | 6/2007 |

* cited by examiner

*Primary Examiner* — Stephen Meier
*Assistant Examiner* — Sarah Al Hashimi
(74) *Attorney, Agent, or Firm* — Fitzpatrick, Cella, Harper & Scinto

(57) ABSTRACT

An image forming apparatus, which forms an image by forming an electrostatic latent image on a photosensitive member with a laser beam, developing the electrostatic latent image with a developer to obtain a developer image, and transferring the developer image to a sheet, includes a light source which outputs the laser beam for exposing the photosensitive member; a PLL circuit which generates a multiplied clock that is obtained by multiplying a reference clock; a pulse-width modulating circuit which outputs a pulse-width-modulated signal based on image data and the multiplied clock in order to drive the light source; and a CPU which obtains image data to be input to the pulse-width modulating circuit and, when it is unnecessary to output the pulse-width-modulated signal based on the obtained image data, controls the PLL circuit so as not to generate the multiplied clock.

8 Claims, 4 Drawing Sheets

IMAGE FORMING APPARATUS

BACKGROUND OF THE INVENTION

1. Field of the Invention

The present invention relates to an image forming apparatus having a clock generating portion.

2. Description of the Related Art

Some conventional image forming apparatuses use a high speed clock whose frequency is several times higher than a frequency of an image clock in order to accomplish high quality image processing and precise position control. An image forming apparatus described in Japanese Patent Application Laid-Open No. H09-183250 uses a high speed clock to adjust the timing of writing an image with high precision. An image forming apparatus described in Japanese Patent Application Laid-Open No. 2007-152731 uses a high speed clock to correct the tone of an image with high precision. The image forming apparatuses of Japanese Patent Application Laid-Open No. H09-183250 and Japanese Patent Application Laid-Open No. 2007-152731 generate a high speed clock with the use of a phase-locked loop circuit (hereinafter, referred to as PLL circuit).

In recent years, image forming apparatuses have been demanded to have improved image quality and the frequency of a high speed clock generated in a clock generating portion of an image forming apparatus has been increasing more and more. In line with that, the increase in the power consumption and heat generation of the clock generating portion is causing a problem.

SUMMARY OF THE INVENTION

An object of the present invention is therefore to reduce power consumption and heat generation of a clock generating portion.

The present invention provides an image forming apparatus which forms an image by forming an electrostatic latent image on a photosensitive member with a laser beam, developing the electrostatic latent image with a developer to obtain a developer image, and transferring the developer image to a recording medium, the image forming apparatus including: a light source which outputs the laser beam for exposing the photosensitive member, a clock generating portion which generates a multiplied clock having a multiplied frequency that is obtained by multiplying a reference frequency of a reference clock, a pulse-width modulating circuit which outputs a pulse-width-modulated signal based on image data and the multiplied clock in order to drive the light source, and a control portion which obtains image data to be input to the pulse-width modulating circuit and, when it is unnecessary to output the pulse-width-modulated signal based on the obtained image data, controls the clock generating portion in such a manner that the clock generating portion does not generate a multiplied clock by multiplying the reference frequency of the reference clock.

Further features of the present invention will become apparent from the following description of exemplary embodiments with reference to the attached drawings.

DESCRIPTION OF THE EMBODIMENTS

The present invention will be described below through an embodiment with reference to the drawings.

(Image Forming Apparatus)

Figure 1:
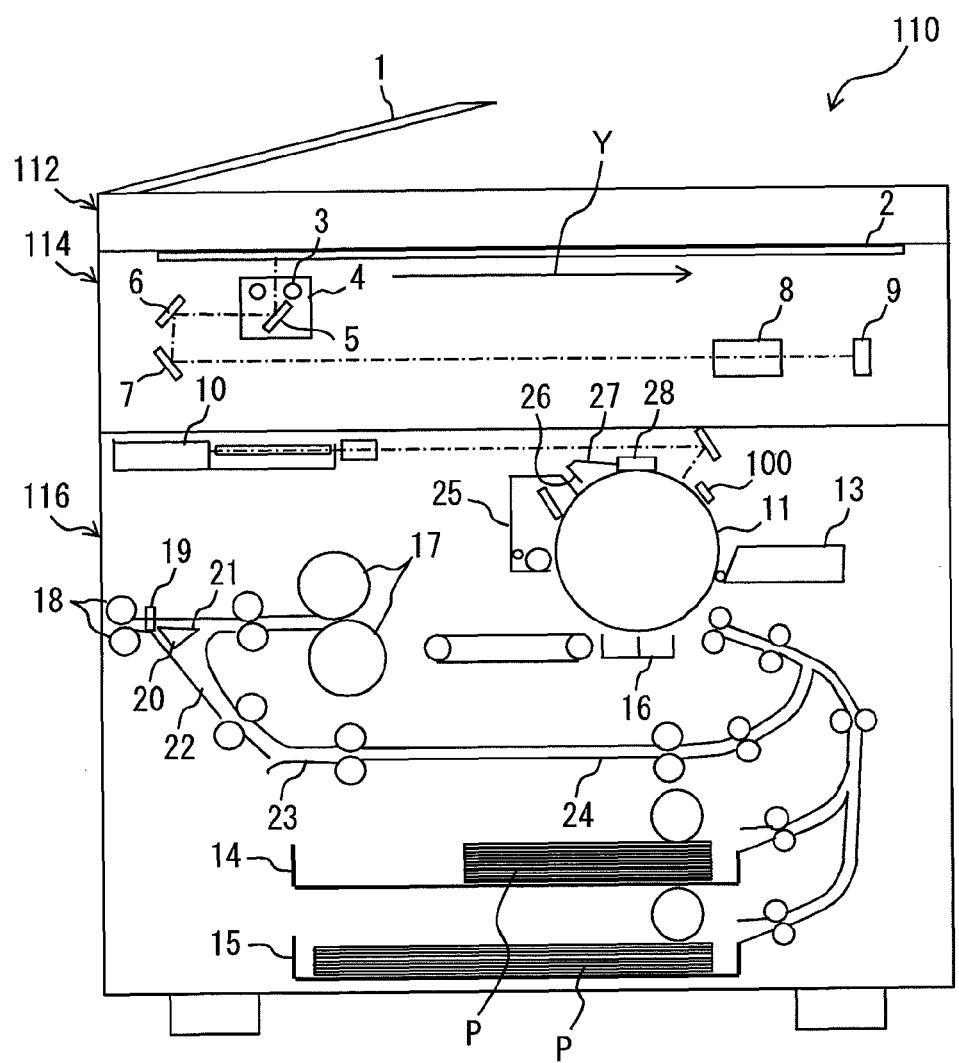
FIG. 1 is a sectional view of an electrophotographic image forming apparatus according to an embodiment of the present invention.

FIG. 1 is a sectional view of an electrophotographic image forming apparatus (hereinafter, referred to as image forming apparatus) 110 according to the embodiment of the present invention. The image forming apparatus 110 includes an original feeding portion 112, an image reading portion 114, and an image forming portion 116. The basic operation of the image forming apparatus 110 will be described with reference to FIG. 1. Originals stacked on a tray 1 of the original feeding portion 112 are fed one by one in order onto an original glass plate 2 of the original reading portion 114. The fed original is stopped at a predetermined point on the original glass plate 2. A scanner unit 4 is moved in a sub scanning direction indicated by the arrow Y, while a lamp 3 provided in the scanner unit 4 lights up to illuminate the original. Light reflected by the original is imaged on an image sensor portion 9 via mirrors 5, 6, and 7 and an imaging optical system 8. The image sensor portion 9 converts the light reflected by the original into an image signal. The image signal is input to an exposure control portion 10 of the image forming portion 116.

The exposure control portion 10 generates a pulse signal that has undergone a pulse width modulation based on the image signal from the image sensor portion 9. The pulse-width-modulated pulse signal is input to a laser drive device 31 (FIG. 2) in the exposure control portion 10. The laser drive device 31 outputs a laser drive signal based on the pulse-width-modulated pulse signal to a laser diode 43 as a light source, thereby causing the laser diode 43 to emit light (to light up and to go out). The laser diode 43 thus outputs a laser beam according to image information to a photosensitive drum (hereinafter, referred to as a photosensitive member) 11.

The photosensitive member 11 has a surface uniformly charged by a charger 28. The laser beam is emitted to the uniformly charged surface of the photosensitive member 11. The laser light forms an electrostatic latent image according to the image information on the surface of the photosensitive member 11. An electric potential sensor 100 detects the electric potential of the electrostatic latent image to monitor whether or not the electric potential on the photosensitive member 11 is normal.

The electrostatic latent image on the photosensitive member 11 is developed into a developer image by a developing unit 13. A sheet of copy paper (hereinafter, referred to as a sheet) P as a recording medium is conveyed from a sheet stacking portion 14 or 15 to a transferring device 16 in time with the developer image on the photosensitive member 11. The transferring device 16 transfers the developer image on the photosensitive member 11 to the sheet P. The sheet P to which the developer image has been transferred is conveyed to a fixing portion 17. The developer image that has been transferred to the sheet P is fixed to the sheet P by the fixing portion 17. An image is thus formed on the sheet P. The sheet P on which an image has been formed is discharged to the outside of the image forming apparatus 110 by a discharging roller pair 18.

After the transfer, the surface of the photosensitive member 11 is cleaned by a cleaner 25. Charges on the surface of the photosensitive member 11 that has been cleaned by the cleaner 25 are eliminated by an auxiliary charger 26. A pre-exposure lamp 27 eliminates residual charges on the photosensitive member 11, thereby readying the surface of the photosensitive member 11 for proper charging by the charger 28. The charger 28 uniformly charges the surface of the photosensitive member 11 in preparation for the forming of the next image.

In the case where images are to be formed on both sides of the sheet P, the rotation of the discharging roller pair 18 is stopped when a sheet detecting portion 19 detects the trailing edge of the sheet P with an image formed on its front side that has been conveyed from the fixing portion 17. A path is switched over to a surface reverse path 22 by a flapper 20 provided on a discharge path 21. The discharging roller pair 18 is then rotated in the reverse direction to convey the sheet P to the surface reverse path 22. The sheet P is conveyed from the surface reverse path 22 through a reversing and conveying path entrance 23 to a reversing and conveying path 24. From the reversing and conveying path 24, the sheet P is conveyed to the transferring device 16 again in order to form an image on the back side of the sheet P in the same manner as in the image forming operation described above.

(Exposure Control Portion)

Figure 2:
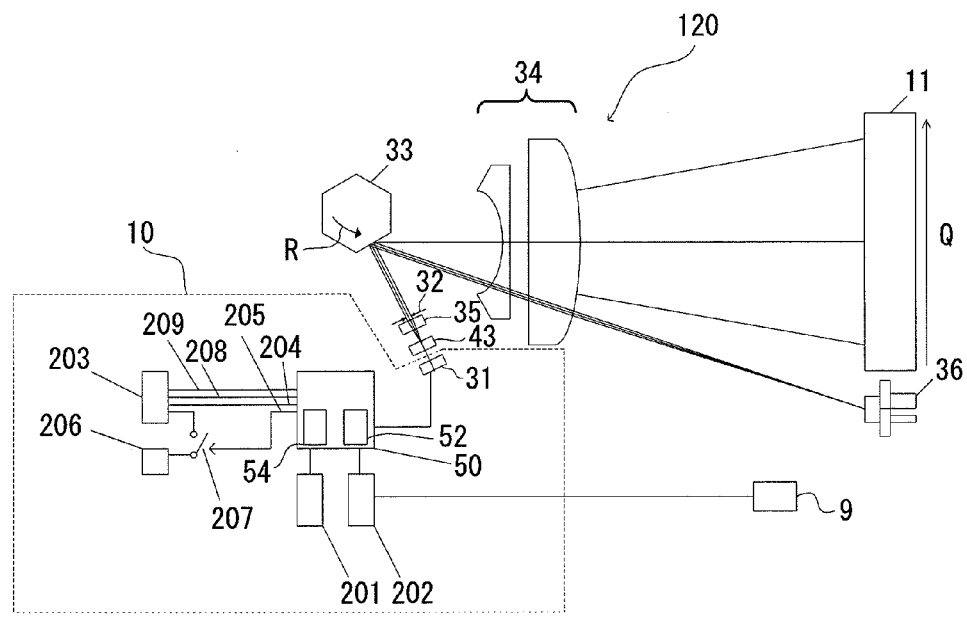
FIG. 2 is a diagram illustrating the structure of a light scanning device according to the embodiment.

FIG. 2 is a diagram illustrating the structure of a light scanning device 120 according to the embodiment. The light scanning device 120 exposes the surface of the photosensitive member 11 by scanning a laser beam that has undergone a pulse width modulation according to image data over the surface of the photosensitive member 11 in a main scanning direction. The light scanning device 120 includes the exposure control portion 10, the laser diode 43, a rotating polygon mirror (hereinafter, referred to as a polygon mirror) 33, an fθ lens 34, and a beam detection sensor (hereinafter, referred to as a BD sensor) 36.

The exposure control portion 10 has an image data RAM (image data supplying portion) 202 for storing image data. An image signal output from the image sensor portion 9 of the image reading portion 114 is stored as image data in the RAM 202 of the exposure control portion 10, which is provided in the image forming portion 116. The RAM 202 can also store image data input from an external device. The RAM 202 supplies image data to an image processing CPU (control portion) 50.

The CPU 50 has a pulse-width modulating circuit 54 for outputting a pulse signal that has undergone a pulse width modulation (PWM) based on image data. A RAM 201 keeps a lookup table (LUT) for pulse width modulation. The CPU 50 has an oscillator (not shown) which outputs a reference clock (hereinafter, referred to as a CPU clock) 208. The CPU 50 inputs image data to the pulse-width modulating circuit 54 according to the CPU clock 208. The CPU clock 208 is input to a PLL circuit (a multiplying unit) 203.

The PLL circuit 203 outputs a multiplied clock (hereinafter, referred to as a high speed clock) 204 having a multiplied frequency that is obtained by multiplying a reference frequency of the CPU clock 208. In short, the PLL circuit 203 is a clock generating portion for generating a multiplied clock having a multiplied frequency that is obtained by multiplying the reference frequency of the reference clock.

The pulse-width modulating circuit 54 generates a pulse signal that has undergone a pulse width modulation based on image data supplied from the RAM 202, the lookup table of the RAM 201, and the high speed clock 204 of the PLL circuit 203. The pulse-width-modulated pulse signal is output to the laser drive device 31 in synchronization with the high speed clock 204 of the PLL circuit 203.

The laser drive device 31 receives the pulse-width-modulated pulse signal from the CPU 50 and outputs a laser drive signal for driving the laser diode 43. A photodiode sensor for detecting a part of a laser beam is provided inside the laser diode 43. A detection signal of the photodiode sensor is used for automatic power control (APC) of the laser diode 43.

The laser diode 43 emits a laser beam based on a laser drive signal. The laser beam emitted from the laser diode 43 is turned into substantially collimated beams by a collimator lens 35 and a stop 32, with the result that beams having a predetermined beam diameter enter the polygon mirror 33.

The polygon mirror 33 rotates at a uniform angular velocity in a direction indicated by the arrow R (counterclockwise). The laser beams that have entered the polygon mirror 33 are deflected at a reflection angle that is varied continuously according to the rotation of the polygon mirror 33. The laser beams deflected by the polygon mirror 33 are condensed by the fθ lens 34. At the same time, the fθ lens 34 corrects distortion in a manner that guarantees the temporal linearity of scanning. The laser beams are thus scanned for imaging over the photosensitive member 11, which is an image bearing member, at a uniform velocity in a direction indicated by the arrow Q of FIG. 2 (a main scanning direction).

The BD sensor 36 is provided outside of an image forming region. The BD sensor 36 is a main scan synchronizing signal generating portion which detects light reflected by the polygon mirror 33 and outputs a main scan synchronizing signal (hereinafter, referred to as a BD signal). The BD signal from the BD sensor 36 is used to keep the image forming point constant in the main scanning direction. When to start outputting the pulse-width-modulated pulse signal, i.e., when to start emitting a laser beam, is determined based on the BD signal.

The CPU 50 executes scanning by causing the laser diode 43 to blink according to a laser drive signal according to image data along each scanning line, after a predetermined delay since the BD signal. The exposure control portion 10 exposes the surface of the photosensitive member 11 in a line pattern by scanning laser beams in the main scanning direction Q. Image data is output line by line in order from the first line. The photosensitive member 11 is rotated and laser beams are emitted line by line after the predetermined time since the BD signal, thereby repeatedly exposing the surface of the photosensitive member 11 in a line pattern. In this manner, the surface of the photosensitive member 11 is exposed in the sub scanning direction as the photosensitive member 11 is rotated, thereby forming the whole image on the surface of the photosensitive member 11.

(PLL Circuit)

Figure 3:
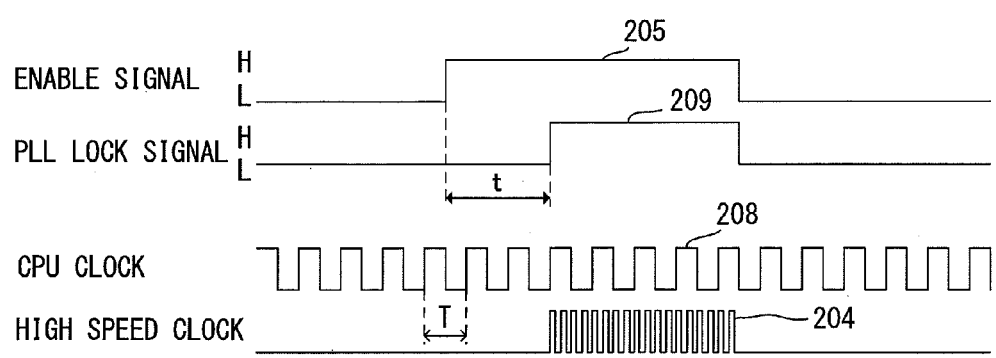
FIG. 3 is a timing chart illustrating the operation of a PLL circuit according to the embodiment.

The detailed operation of the PLL circuit 203 will be described. FIG. 3 is a timing chart illustrating the operation of the PLL circuit 203 of this embodiment. The PLL circuit 203 is a frequency multiplier (a frequency synthesizer) that oscillates synchronously at a frequency obtained by multiplying the frequency of an input signal.

The PLL circuit 203 receives a supply of electric power from a power supply 206. A switch 207 is disposed between the PLL circuit 203 and the power supply 206. The switch 207 is switched on and off according to an enable signal 205 from the CPU 50. The start and stop of the driving of the PLL circuit 203 is therefore controlled by the switch 207 according to the enable signal 205 from the CPU 50.

The PLL circuit 203 also adds or removes auxiliary pixels in accordance with the scanning magnification settings after PWM table conversion is performed, and corrects a difference between the image data length and the length of scanning on the photosensitive member 11 for exposure. The difference between the image data length and the length of scanning on the photosensitive member 11 for exposure is caused by an error in optical path length due to the assembly precision of the image forming apparatus and the precision of the fθ lens 34.

By controlling the on/off of the switch 207 with the enable signal 205 output from the CPU 50, the supply of electric power from the power supply 206 to the PLL circuit 203 is controlled.

The CPU 50 obtains image data to be input to the pulse-width modulating circuit 54, and determines whether or not it is necessary to output a signal that has undergone a pulse width modulation based on the obtained image data. When it is necessary to output the pulse-width-modulated signal, the CPU 50 starts the driving of the PLL circuit 203. When it is unnecessary to output the pulse-width-modulated signal, on the other hand, the CPU 50 stops the driving of the PLL circuit 203.

In other words, the CPU 50 starts the driving of the PLL circuit 203 by generating the enable signal 205 (with the enable signal set to H) when it is necessary to output a pulse-width-modulated signal based on the high speed clock 204. When it is unnecessary to output a pulse-width-modulated signal based on the high speed clock 204, on the other hand, the CPU 50 stops the driving of the PLL circuit 203 by cutting off the enable signal 205 (with the enable signal set to L).

To give a more detailed description, the CPU 50 obtains image data to be input to the pulse-width modulating circuit 54 within a lock time of the PLL circuit 203. In the case where obtained image data contains at least one piece of data that causes the laser diode 43 to light up, the CPU 50 sets the enable signal to H and starts the driving of the PLL circuit 203. In the case where obtained image data contains no data that causes the laser diode 43 to light up, on the other hand, the CPU 50 sets the enable signal to L and stops the driving of the PLL circuit 203.

When the enable signal 205 is L, the switch 207 is turned off to stop the supply of electric power from the power supply 206 to the PLL circuit 203. At this time, the power consumption of the PLL circuit 203 is 0 because electric power is not supplied from the power supply 206 to the PLL circuit 203. When the enable signal 205 is H, the switch 207 is turned on to supply the electric power from the power supply 206 to the PLL circuit 203.

As illustrated in FIG. 3, when the enable signal 205 is H, a PLL lock signal 209 inside the PLL circuit 203 becomes H after a lock time "t" of the PLL circuit 203. The lock time "t" is a time that the PLL circuit 203 requires to switch from the reference frequency to the multiplied frequency. When the PLL lock signal 209 is H, the high speed clock 204 obtained by multiplying the CPU clock is output. In this embodiment illustrated in FIG. 3, the CPU clock is multiplied by 4.

In a generally and widely used PLL circuit, the lock time "t" is determined by a clock of an original frequency to be multiplied (the CPU clock in this embodiment), and the constant number and structure of an internal circuit element, which is a constituent of the PLL circuit. Among the values of lock time "t" under various environment conditions in which the PLL circuit 203 operates, the maximum value is defined as a reference lock time tmax. In other words, if the reference lock time tmax has elapsed after the enable signal 205 becomes H in an environment where the PLL circuit 203 operates, it is guaranteed that the high speed clock 204 can be used without fail.

While the reference lock time tmax in this embodiment is the maximum value among lock time "t" values in various environments where the PLL circuit 203 operates, the present invention is not limited thereto. For instance, lock time "t" values in an environment where the PLL circuit 203 can operate but the image forming apparatus 110 does not operate may be excluded in selecting the reference lock time tmax. In other words, the reference lock time tmax may be the maximum value among the lock time "t" values of the PLL circuit 203 in operating environments where the image forming apparatus 110 is usually expected to be used. The description of this embodiment takes as an example a case where the reference lock time tmax is 20 μs (microseconds).

(Operation of CPU)

Next, the operation of the CPU 50 performed when the image forming apparatus forms an image in this embodiment will be described.

Figure 4:
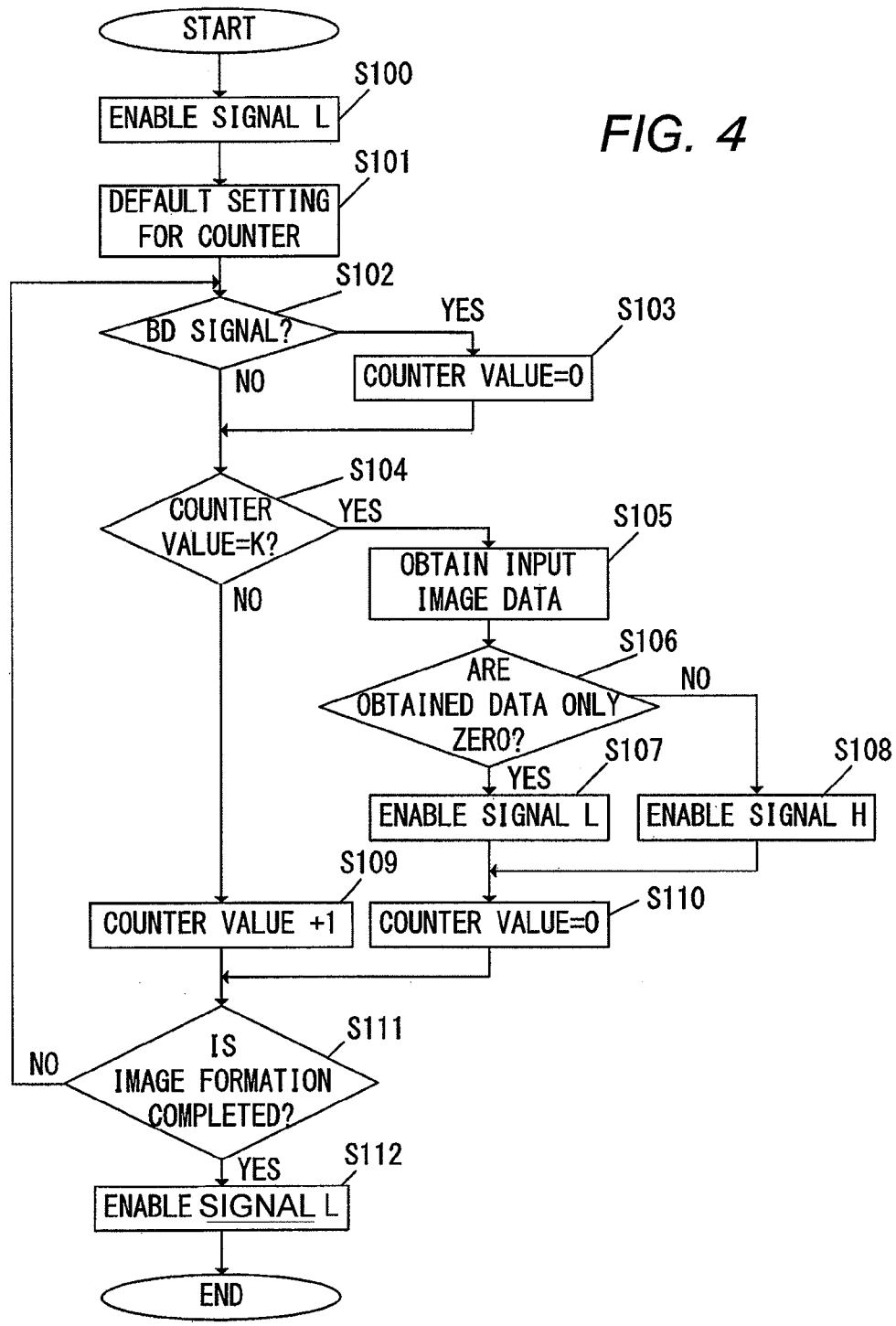
FIG. 4 is a flow chart illustrating the operation of a CPU according to the embodiment.

FIG. 4 is a flow chart illustrating the operation of the CPU 50 according to this embodiment. Throughout the flow of FIG. 4, the CPU 50 keeps inputting the CPU clock 208 to the PLL circuit 203. The PLL lock signal 209 operates according to the enable signal 205 in the manner illustrated in the timing chart of FIG. 3.

A pulse-width-modulated pulse signal (hereinafter, referred to as output image data) which the CPU 50 outputs to the laser drive device 31 is always 0 when the PLL lock signal 209 of the PLL circuit 203 is L. When the PLL lock signal 209 is H, the output image data is 1 and the pulse width of the output image data is modulated according to image data (hereinafter, referred to as input image data) supplied from the RAM 202. The input image data is multivalued data. The output image data is binary data.

In Step S100, the CPU 50 sets the enable signal 205 to L as default settings prior to an image formation, and stops the PLL circuit 203.

In Step S101, the CPU 50 performs default setting for a counter 52. The counter 52 is provided in order to determine a sampling point by counting a sampling period. Specifically, the threshold of the counter 52 is set to a predetermined value K and the counter value for a sampling period is set to 0. The threshold K is a value according to an input period T of the input image data. The sampling period is for determining when to sample the input image data supplied from the RAM 202 to the CPU 50.

The CPU clock 208 output from the oscillator (not shown) of the CPU 50 is an image clock here. The image clock determines the light emission timing per pixel of a laser beam scanned over the photosensitive member 11. For example, in the case of the image forming apparatus 110 in which a frequency of an image clock is 0.1 MHz, the input image data is continuously input from the RAM 202 to the pulse-width modulating circuit 54 of the CPU 50 with the input period T set to 10 μs. A value equivalent to the input period T of 10 μs is therefore set as the threshold K of the counter 52.

The value of the threshold K is dependent on a frequency for counting the counter 52. For example, in the case where a frequency of 20 MHz is used to count on the counter 52, the period of this frequency is 50 ns (nanoseconds), and the threshold K is calculated as 200 by 10 μs/50 ns=200. The sampling period is matched with the input period T of the input image data in this manner. The sampling period is matched with the input period T of the input image data because there is no need to change the enable signal 205 unless the input image data is updated in steps described below. This way, the image forming apparatus 110 avoids an increase in power consumption and heat generation that results from unnecessarily driving of the PLL circuit 203 when the high speed clock 204 is not needed.

In Step S102, the CPU 50 detects the BD signal from the BD sensor 36. The BD signal in this embodiment is low-active. The CPU 50 proceeds to step S103 when a falling edge of the BD signal is detected (YES in S102), and otherwise (NO in S102) proceeds to Step S104.

In Step S103, the CPU 50 sets the counter value of the counter 52 to 0. The initialization of the counter value of the counter 52 is synchronized with the BD signal because supplying the input image data and outputting the output image data are executed in synchronization with the BD signal.

In Step S104, the CPU 50 determines whether or not the counter value of the counter 52 equals the threshold K. When the counter value does not equal the threshold K (NO in S104), the CPU 50 proceeds to Step S109. In Step S109, the CPU 50 increases the counter value of the counter 52 used for the determination of a sampling point by 1. In Step S111, the CPU 50 determines whether or not to end the image formation. In other words, the CPU 50 determines whether or not the image formation of a whole page has been completed. When the image formation has not been completed (NO in S111), the CPU 50 returns to Step S102.

When the counter value equals the threshold K in Step S104 (YES in S104), the CPU 50 determines this point as a sampling point, and proceeds to Step S105 in order to control the enable signal 205.

In Step S105, the CPU 50 obtains the input image data to be input to the pulse-width modulating circuit 54 within a period between the current time and the reference lock time tmax. For example, in the image forming apparatus 110 of this embodiment, the frequency of the image clock (CPU clock) 208 is 0.1 MHz, the input period T of the input image data is 10 μs, and the reference lock time tmax is 20 μs. When the number of pieces of input image data to be input to the pulse-width modulating circuit 54 within a period between the current time and the reference lock time tmax is given as "z" ("z" is an integer), the number "z" of pieces satisfies the following expression:

$$z \times T > tmax.$$

The number "z" of pieces of input image data is preferably the smallest value of "z" values that satisfy the above-mentioned expression because the stop time of the PLL circuit 203 can be prolonged and the processing time of the input image data can be shortened. The number "z" of pieces of input image data is counted by counting the input image data in a single input period T as one. In this embodiment, the number "z" of pieces of input image data is 3, and, in Step S105, the CPU 50 accordingly obtains three pieces of input image data that have been input since the current time.

In Step S106, the CPU 50 determines whether or not every piece of input image data obtained in Step S105 has a value 0. In the case where every piece of obtained input image data has a value 0 (YES in S106), the CPU 50 proceeds to Step S107. In this case, every piece of obtained input image data is data that does not cause the laser diode 43 to light up, and the CPU 50 therefore sets the enable signal 205 to L in Step S107 to stop the driving of the PLL circuit 203. This reduces the power consumption and heat generation of the PLL circuit 203.

On the other hand, when values other than 0 are included in the values of the obtained input image data (NO in S106), the CPU 50 proceeds to Step S108. In this case, at least one piece of obtained input image data is data that causes the laser diode 43 to light up, and the CPU 50 therefore sets the enable signal 205 to H in Step S108 to start the driving of the PLL circuit 203. Thereby, the PLL circuit 203 can oscillate the high speed clock 204 by the time input image data to be subjected to a pulse width modulation is input to the pulse-width modulating circuit 54.

In Step S110, the CPU 50 sets the counter value of the counter 52 used for the determination of a sampling point to 0.

In Step S111, the CPU 50 determines whether or not image formation of a whole page has been completed. When the image formation has not been completed (NO in S111), the CPU 50 returns to Step S102. When the image formation has been completed (YES in S111), the CPU 50 proceeds to Step S112. In Step S112, the CPU 50 sets the enable signal to L and stops the driving of the PLL circuit 203.

Figure 5:
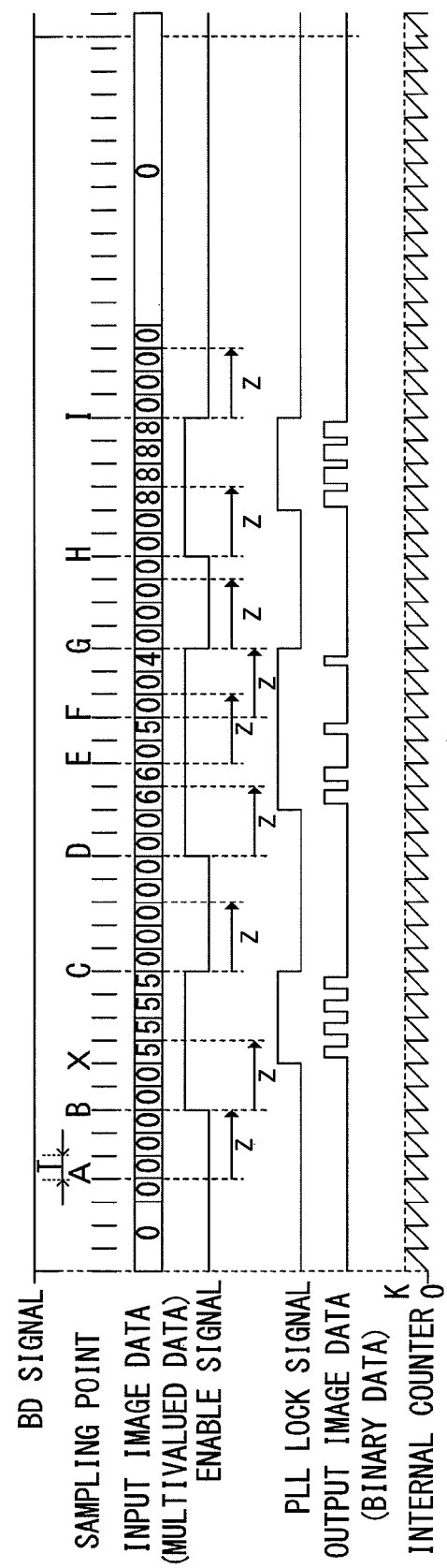
FIG. 5 is a timing chart illustrating respective signals according to the embodiment.

FIG. 5 is a timing chart illustrating respective signals according to this embodiment. FIG. 5 illustrates the behavior of the respective signals relevant to one line of image data from the reception of the BD signal to the reception of the next BD signal. FIG. 5 illustrates the BD signal, sampling points, input image data (multivalued data), the enable signal 205, the PLL lock signal 209, pulse-width-modulated output image data (binary data), and the counter value of the counter 52.

In this embodiment, the input period T of the input image data is 10 μs and the threshold K of the counter 52 is a value equivalent to 10 μs as described above in the description of Step S101. The number "z" of pieces of input image data obtained in a period between a sampling point and the reference lock time tmax is 3 as described above in the description of Step S105.

The signal behavior relevant to a sampling point A will be described. At the sampling point A, the CPU 50 obtains three pieces of input image data. Every piece of obtained input image data has a value 0, and the enable signal 205 is therefore set to L to stop the driving of the PLL circuit 203.

Next, the signal behavior relevant to a sampling point B will be described. At the sampling point B, the CPU obtains three pieces of input image data. The values of the obtained input image data are 0, 0, and 5 in chronological order, instead of 0, 0, and 0 (all 0). The CPU 50 therefore sets the enable signal 205 to H to start the driving of the PLL circuit 203.

The reference lock time tmax is shorter than z×T (z×T>tmax) from Step S105. This expression indicates that a period between the current time and the time when input image data of the z-th pixel is input to the pulse-width modulating circuit 54 is longer than the reference lock time tmax. This means that, by setting the enable signal 205 to H at the sampling point B, the PLL circuit 203 is guaranteed to be locked at a sampling point X which is ahead of the sampling point B by two pixels. In short, it is guaranteed that the PLL lock signal 209 is H at the sampling point X.

The CPU 50 performs the operation described above each time a sampling point occurs, and uses the enable signal 205 to control the driving of the PLL circuit 203 within a range that does not affect image formation. As a result, the PLL circuit 203 is controlled to be in a stop state during a period where the high speed clock 204 is unnecessary for image formation, and to be in a driven state during a period where the high speed clock 204 is necessary for image formation with the lock time taken into account. In this manner, the power consumption and heat generation of the PLL circuit 203 can be reduced with efficiency.

The description of this embodiment takes a copier as an example of the image forming apparatus, but the present invention is not limited thereto. The present invention is also applicable to other image forming apparatuses such as laser beam printers, multi-function printers, facsimile machines, and word processors. These image forming apparatuses include color image forming apparatuses in addition to monochrome image forming apparatuses.

Image data from which an image is formed by the image forming apparatus is not limited to image data read by the image reading portion, and may be image data input from an external computer or image data stored in a storage medium that can be loaded in and ejected from the image forming apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-211733, filed Sep. 22, 2010, which is hereby incorporated by reference herein in its entirety.

What is claimed is:

1. An image forming apparatus which forms an image by forming an electrostatic latent image on a photosensitive member with a laser beam, developing the electrostatic latent image with a developer, and transferring an image developed with the developer to a recording medium, the image forming apparatus comprising:
    a light source configured to output the laser beam for exposing the photosensitive member;
    a first signal generating unit configured to generate an image clock signal;
    a second signal generating unit configured to generate a multiplied clock signal by multiplying the image clock signal generated by the first signal generating unit;
    a storage unit configured to store image data;
    a control unit configured to read the image data from the storage unit in synchronism with the image clock signal, and to cause the second signal generating unit to generate the multiplied clock signal in a case where first data for causing the light source to output the laser beam is included in the image data read from the storage unit in synchronism with the image clock signal, while stopping the second signal generating unit from generating the multiplied clock signal in a case where second data for preventing the light source from outputting the laser beam is included in the image data read from the storage unit in synchronism with the image clock signal;
    a data processing unit configured to process the first data read from the storage unit based on the multiplied clock signal, output the first data processed based on the multiplied clock signal in synchronism with the multiplied clock signal, process the second data read from the storage unit based on the image clock signal and output the second data rocessed based on the image clock signal in synchronism with the image clock signal; and
    a drive unit configured to drive the light source based on the first data and the second data output from the data processing unit.

2. An image forming apparatus according to claim 1, wherein a predetermined lock time is required for the second signal generating unit to go from a state in which the second signal generating unit stops generating the multiplied clock signal to a state in which the second signal generating unit can start generating the multiplied clock signal, and the control unit reads the image data of an amount corresponding to at least the predetermined lock time from the storage unit in synchronism with the image clock signal.

3. An image forming apparatus according to claim 2, wherein the image clock signal defines an input period T of the image data to be input to the data processing unit,
    wherein the lock time comprises a reference lock time tmax which has a maximum value under operating environment conditions of the second signal generating unit, and
    wherein a number z of pieces of image data to be input to the data processing unit during the reference lock time tmax satisfies the following expression:

$z \times T > t\text{max}.$

4. An image forming apparatus according to claim 3, wherein the number z of pieces of image data comprises a smallest value that satisfies z×T>tmax.

5. An image forming apparatus according to claim 2, further comprising a counter which counts the image clock signal.

6. An image forming apparatus according to claim 5, further comprising a main scan synchronizing signal generating portion which generates a main scan synchronizing signal for determining when to start causing the drive unit to drive the light source,
    wherein the control portion initializes a counter value of the counter when receiving the main scan synchronizing signal.

7. An image forming apparatus according to claim 1, further comprising:
    a power supply configured to supply electric power to the second signal generating unit; and
    a switch disposed between the second signal generating unit and the power supply,
    wherein the control unit controls the switch to cause the power supply to supply the electric power to the second signal generating unit in a case where the image data read from the storage unit in synchronism with the image clock signal includes the first data, while the control unit controls the switch to prevent the power supply from supplying the electric power to the second signal generating unit in a case where the image data read from the storage unit in synchronism with the image clock signal includes the second data.

8. An image forming apparatus according to claim 1, wherein the image data stored in the storage unit comprises multivalued data, and the data processing unit converts the first data from the multivalued data to binary data based on the multiplied clock signal and converts the second data from the multivalued data to the binary data based on the image clock signal.

* * * * *